March 27, 1951         J. W. STECKBAUER         2,546,795
                        RADIANT TOASTER
                      Filed Dec. 10, 1948
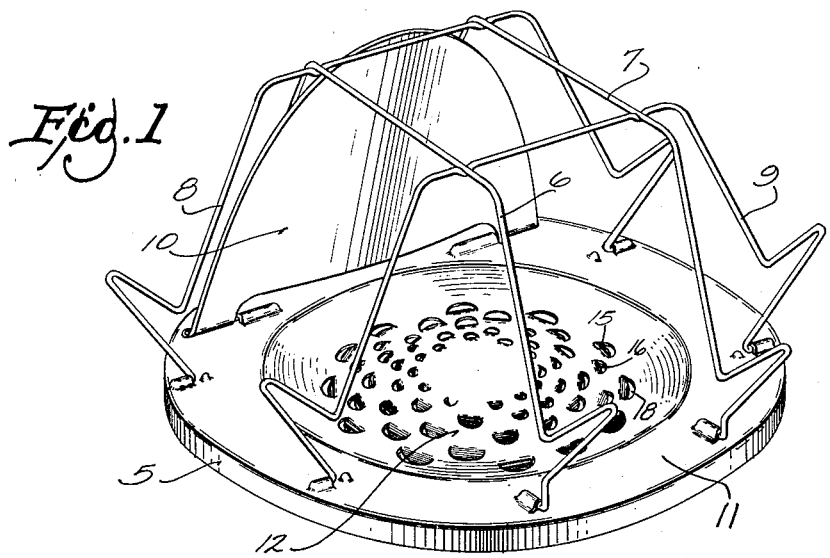
Fig. 1
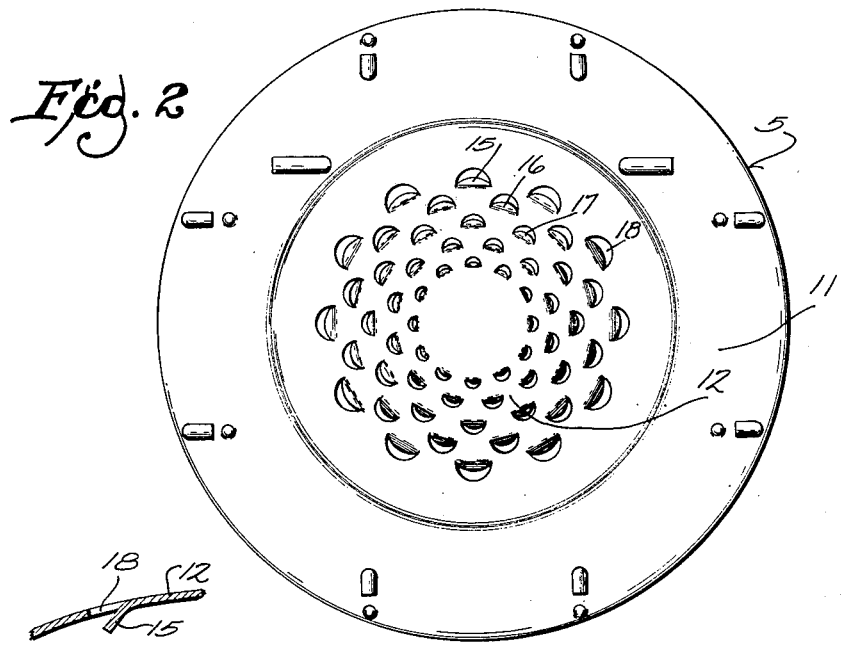
Fig. 2
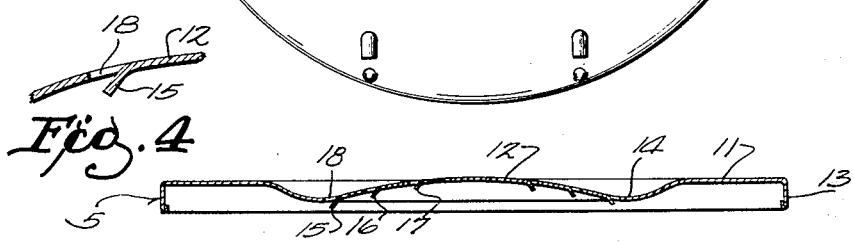
Fig. 4
Fig. 3
Inventor
JOSEPH W. STECKBAUER
Wheeler, Wheeler & Wheeler
Attorneys Patented Mar. 27, 1951

2,546,795

UNITED STATES PATENT OFFICE 2,546,795

RADIANT TOASTER

Joseph W. Steckbauer, Manitowoc, Wis.

Application December 10, 1948, Serial No. 64,484

3 Claims. (Cl. 99—385)

This invention relates to improvements in radiant toasters.

The invention is concerned with a toaster for use over an open flame, such as the flame of a gas burner, or a coal or wood stove. It is a primary object of the invention to reduce the toasting time by increasing radiation from a radiant plate in the center of the toaster base. The manner in which this is accomplished will appear more particularly from the following disclosure of the invention.

In the drawings:

Fig. 1 is a view in perspective showing a toaster embodying the invention.

Fig. 2 is a plan view of the toaster base.

Fig. 3 is a detail view of the base in cross section.

Fig. 4 is an enlarged fragmentary detail view in perspective cross section.

Although the present invention is concerned entirely with the base, I have illustrated in Fig. 1 a complete toaster to indicate the general type of organization with which the invention is used. There is a base at 5 to which are pivoted the racks 6, 7, 8 and 9, these being adapted, when erected as shown in Fig. 1, to provide support for three pieces of toast which are set ninety degrees apart around the base and are slightly inclined over the center. On the fourth side of the base, there is a reflector at 10, likewise desirably pivoted to the base, the arrangement being such that the reflector and the wire racks are also collapsible on the base for storage or transportation.

In previous devices of this general character, a separate radiant plate has frequently been used in the center of an annular base. In the present device, the base includes in one piece an outer ring 11 and a radiant center 12. The outer ring is flanged downwardly at 13 around its perimeter. In use, the base will ordinarily rest upon the flange or rim thus formed. Within the outer rim 11, the base is preferably annularly channelled downwardly at 14, and within this channel there is the integral, upwardly convex, radiant plate portion 12.

The present invention contemplates the provision in the radiant area 12 of a plurality of annular series of downwardly and inwardly directed tongues 15, 16, 17 and so forth. While the shape of the tongues is by no means critical, each is desirably bluntly pointed. The tongues may conveniently be made by punching them out from correspondingly shaped apertures 18. The cut margins of the plate around the apertures, and the corresponding cut margins of the respective tongues, are desirably arcuate and desirably limited to one hundred and eighty degrees or less in extent. The tongues desirably, although not necessarily, are directed radially outwardly from the center of the radial area 12.

It is also desirable that the openings formed by the tongues be staggered in consecutive series and so shaped that the total angular extent of each opening will be at least approximately equal to the space between the consecutive openings in adjacent series. This greatly increases the length of the path upon which heat may be carried by conduction through the metal from the very hot portion of the radiant area 12 at the center thereof toward the annular rim 11, which is not directly exposed to the flame.

The provision of these tongues produces noteworthy increases in the rate of toasting. The most efficient prior art toaster found has a radiant plate that is perforated but has no tongues. Over a certain source of heat, this toaster required two and a half minutes to produce toast of a given color. Using the same heat source and with no change other than substitution of the plate with tongues as herein disclosed, the same toast was produced in two minutes.

The preliminary heating time for bringing the toaster up to effective temperature is also reduced. In the case of a toaster having a radiant insert apertured but without the tongues, a given source of heat required thirty seconds to bring the toaster up to radiant heat. With no change in the toaster or the source of heat except the substitution of a radiant insert provided with tongues as herein disclosed, the heating time was reduced to fifteen seconds.

The above toasting figures refer to the toasting of bread on the first side. The toasting of the second side of a given piece of bread is not as greatly reduced, but is reduced to save about two-thirds as much time as is saved in toasting the first side.

The increased temperature of the radiant area 12 is believed to be attributable to several factors. In the first place, since only the central portion of the toaster base is exposed to direct heat, there is a constant leakage of heat by conduction from the heated center to the unheated rim. This conductivity is minimized by the holes which increase the length of the metallic path from the center outwardly (thereby eliminating the burning of the lower edge of toast).

In the second place, the tongues greatly increase the surface area for heat absorption into the radiant portion of the base.

In the third place, the tongues, being downwardly offset toward the source of heat, are closer to the source and therefore pick up more heat.

Finally, no metal is removed. The removal of metal would reduce the radiant area. Not only does the radiant surface retain its full radiant area, but the effectiveness thereof on the toast seems to be increased by so inclining each tongue that the top face of the highly heated tongue approaches parallelism with the bread mounted on the rack for toasting.

While I have shown the base to be of circular form, with an annular rim around the radiant area, the latter also being circular, it will be apparent that the present invention is not in any way concerned with the shape or outline. Neither is it essential that the radiant area be integral with the rim, although great savings in manufacturing costs are achieved by the one-piece construction which is made practical by the fact that the elongated heat conducting paths resulting from the use of the present invention prevent the rim from becoming unduly heated.

I claim:

1. In a toaster of the type provided with a support for bread to be toasted and a base having a heat radiant central area and surrounding rim, a base of generally circular form having a rim portion, an upwardly convex heat radiating central portion and an upwardly concave annular portion between the rim and radiating central portion, the radiating central portion being provided with a plurality of annular rows comprising a series of openings, each of which openings has its radially outward margin arcuate, and each of which openings has its radially inward margin formed by a tongue integral with said central portion and substantially corresponding in form to the opening, the respective tongues projecting radially and downwardly toward the rim to absorb heat from a source beneath said base and to radiate such heat upwardly and outwardly through the openings.

2. The device of claim 1 in which the said openings are staggered in the respective annular rows, the openings in a given annular row having an angular extent at least approximately equalling the spacing between openings in the next inner row, whereby to elongate thermally conductive paths upon which heat may flow outwardly from the center of said base toward the said rim.

3. In a radiant toaster the combination with a base having a radiant central portion and a rim portion peripherally supporting said central portion, of toast supporting racks mounted upon said rim, said radiant central portion comprising spaced openings and downwardly projecting radiant tongues at the inner margins of the openings, said tongues being substantially faced toward said toast racks to direct radiant heat through said openings upon the toast supported by the racks.

JOSEPH W. STECKBAUER.

REFERENCES CITED

The following references are of record in the file of this patent:

UNITED STATES PATENTS

| Number | Name | Date |
| --- | --- | --- |
| 1,014,548 | Willis | Jan. 9, 1912 |
| 1,067,428 | Holder et al. | July 15, 1913 |
| 1,164,066 | Burleson et al. | Dec. 14, 1915 |
| 1,202,059 | Greener | Oct. 24, 1916 |
| 1,216,525 | Weaver | Feb. 20, 1917 |
| 1,397,959 | Heath | Nov. 22, 1921 |
| 1,808,550 | Harpman | June 2, 1931 |
| 2,348,452 | Christopher | May 9, 1944 |